Patented May 19, 1931

1,805,873

UNITED STATES PATENT OFFICE

OSCAR KÄSELITZ, OF BERLIN, GERMANY

METHOD OF PRODUCING POTASSIUM PHOSPHATE

No Drawing. Application filed June 17, 1929, Serial No. 371,722, and in Germany November 19, 1928.

My invention refers to the production of potassium phosphate and more especially mono-potassium phosphate from potassium chloride and phosphoric acid.

It is known that phosphoric acid will replace the hydrochloric acid in potassium chloride, however, this process occurs only at high temperature with such velocity that it is not commercial, the temperatures required leading to the formation of considerable quantities of the undesirable metaphosphate. Moreover, the reaction vessel is quickly destroyed in proportion to the rise in concentration and temperature.

On the other hand, if the operation is carried out with less concentrated phosphoric acid, the hydrochloric acid will escape only very slowly, and a complete conversion into monophosphate cannot be attained.

Contrary to all expectations I have now found that it is possible to carry through this reaction with phosphoric acid of medium concentration and at a temperature which is so low that no metaphosphate worth speaking of is formed. With a quantity, in excess of the molecular, of dilute phosphoric acid of or above 30% concentration, all the chlorine will be expelled under the form of HCl already at 130° C. together with a certain quantity of water, which is evaporated, and in the hot solution crystals of the double-salt $KH_2PO_4 \cdot H_3PO_4$ separate out, but no metaphosphate is formed.

If the operation is carried out under a partial vacuum, the expulsion of HCl is accelerated.

The double-salt separated out from the mother liquor is treated with so much water or mono-potassium phosphate solution that there is obtained solid mono-potassium phosphate and a liquor saturated with monophosphate and the double-salt. The liquor separated from the monophosphate and the mother liquor from the double-salt are used under addition of double-salt, while the monophosphate is treated with water, the resulting liquor being re-used in the decomposition of the double-salt.

I may, however, also add to the hot solution obtained after expulsion of the hydrochloric acid so much water or mono-potassium phosphate solution that after cooling and separation of mono-potassium phosphate a liquor is obtained, the composition of which corresponds to the liquor above described, which results in the decomposition of the double-salt. If the process is modified in this manner I avoid the separation of the double-salt from its mother liquor and the decomposition in a separate operation.

Example

As starting material shall be used the decomposition liquor obtained on washing the double-salt, containing 34% $H_3PO_4$, 31% $KH_2PO_4$ and 35% $H_2O$. In order to obtain 100 kilograms mono-potassium phosphate, 373 kilograms of this solution are required, which are prepared by mixing 126.8 kilograms $H_3PO_4$, 115.6 kilograms $KH_2PO_4$ and 130.5 kilograms $H_2O$. Into this liquor are entered 374 kilograms $H_3PO_4$ (100%) and 103 kilograms KCl (100%). The mixture is heated under stirring to about 130° C. The chlorine in the potassium chloride escapes as hydrochloric acid and is condensed. Thereupon the reaction mixture is cooled down to 20° C., whereupon the double-salt separates out, which is filtered by suction. There are obtained 303 kilograms $KH_2PO_4 \cdot H_3PO_4$ and 497 kilograms of a mother liquor containing 47.96% $H_3PO_4$, 25.76% $KH_2PO_4$ and 26.28% $H_2O$.

In order to convert the double-salt into mono-potassium phosphate, it is treated with a solution saturated with $KH_2PO_4$ and having the composition: 23.1% $KH_2PO_4$ and 76.9% $H_2O$. The decomposition of the quantity of double-salt obtained requires 170 kilograms of a liquor prepared by dissolving 39.3 kilograms $KH_2PO_4$ in 130.7 kilograms $H_2O$. This liquor is well mixed, by means of an agitating device, with the double-salt and the mono-potassium phosphate resulting in the operation is separated by filtration. I thus obtain 100 kilograms mono-potassium phosphate and 373 kilograms of a decomposition liquor, which can now be used as starting material in a new operation.

Various changes may be made in the details disclosed in the foregoing specification without departing from the invention or sacrificing the advantages thereof.

In the claims affixed to this specification no selection of any particular modification of the invention is intended to the exclusion of other modifications thereof and the right to subsequently make claim to any modification not covered by these claims is expressly reserved.

I claim:—

1. The process of producing mono-potassium phosphate from phosphoric acid and potassium chloride comprising heating potassium chloride with a quantity, in excess of the molecular, of dilute phosphoric acid having a concentration of at least 30% until the hydrochloric acid has been expelled and decomposing the acid salt resulting on cooling of the solution with so much water that monophosphate is separated out and a liquor is formed which is saturated with monophosphate ($KH_2PO_4$) and the double-salt $$KH_2PO_4 \cdot H_3PO_4.$$

2. The process of producing mono-potassium phosphate from phosphoric acid and potassium chloride comprising heating potassium chloride with a quantity, in excess of the molecular, of dilute phosphoric acid until the hydrochloric acid has been expelled and decomposing the acid salt resulting on cooling of the solution with so much water, in which monopotassium phosphate is dissolved that monophosphate is separated out and a liquor is formed which is saturated with monophosphate ($KH_2PO_4$) and the double-salt $KH_2PO_4 \cdot H_3PO_4$.

3. The process of producing mono-potassium phosphate from phosphoric acid and potassium chloride comprising heating potassium chloride with a quantity, in excess of the molecular, of dilute phosphoric acid until the hydrochloric acid has been expelled, decomposing the hot solution, after the expulsion of the hydrochloric acid, with such an amount of water that, after cooling, the solution obtained according to claim 1 by the decomposition of the double-salt is produced as a mother liquor, and decomposing the acid salt resulting on cooling of the solution with so much water that monophosphate is separated out and a liquor is formed which is saturated with monophosphate ($KH_2PO_4$) and the double-salt $$KH_2PO_4 \cdot H_3PO_4.$$

4. The process of producing mono-potassium phosphate from phosphoric acid and potassium chloride comprising heating potassium chloride with a quantity, in excess of the molecular, of dilute phosphoric acid until the hydrochloric acid has been expelled, decomposing the hot solution, after the expulsion of the hydrochloric acid, with such an amount of water, in which mono-potassium phosphate is dissolved that, after cooling, the solution obtained according to claim 1 by the decomposition of the double salt is produced as a mother liquor, and decomposing the acid salt resulting on cooling of the solution with so much water that monophosphate is separated out and a liquor is formed which is saturated with monophosphate ($KH_2PO_4$) and the double-salt $KH_2PO_4 \cdot H_3PO_4$.

In testimony whereof I affix my signature.

OSCAR KASELITZ.